Jan. 17, 1967 J. E. MAMBOURG 3,298,814
APPARATUS FOR PREVENTING DEVITRIFICATION OF MOLTEN
GLASS AT THE JOINTS OF A GLASS FURNACE
Filed May 8, 1962
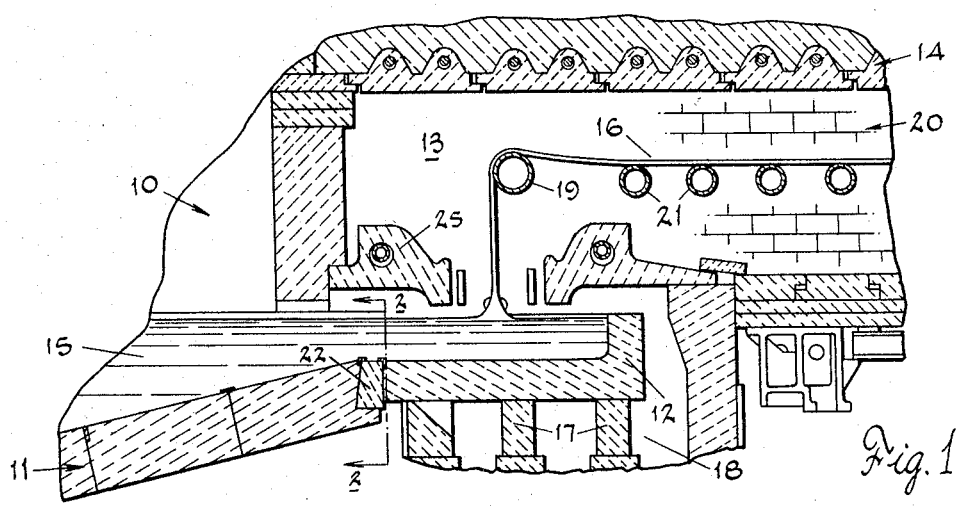
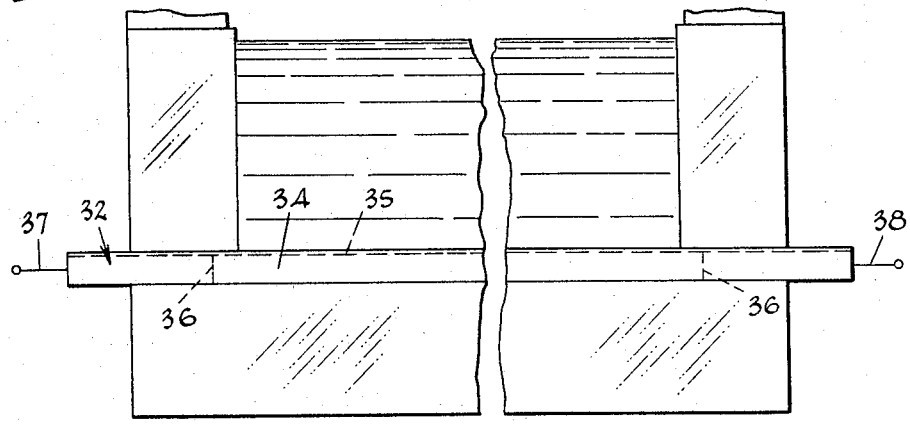
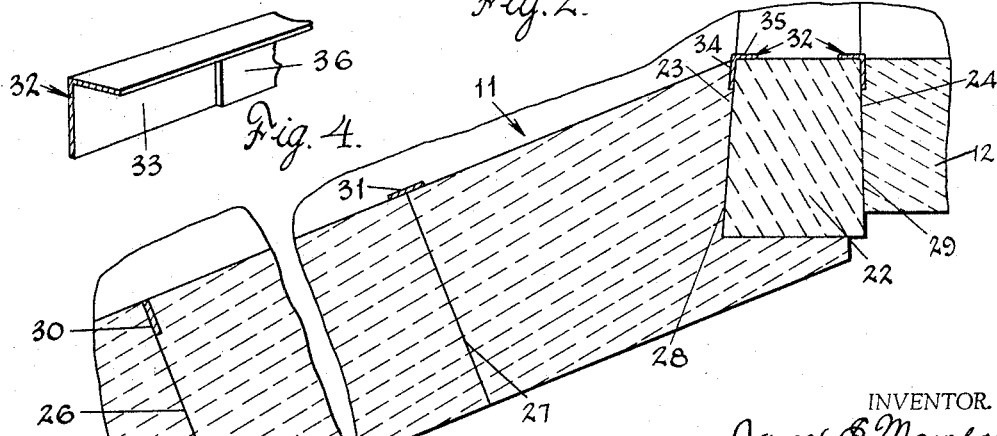
INVENTOR.
James E. Mambourg
BY
Nobbe & Swope
ATTORNEYS United States Patent Office 3,298,814
Patented Jan. 17, 1967

3,298,814
APPARATUS FOR PREVENTING DEVITRIFICA-
TION OF MOLTEN GLASS AT THE JOINTS OF A
GLASS FURNACE
James E. Mambourg, Shreveport, La., assignor to Libbey-
Owens-Ford Glass Company, Toledo, Ohio, a corporation of Ohio
Filed May 8, 1962, Ser. No. 193,141
4 Claims. (Cl. 65—346)

The present invention relates broadly to the production of glass articles from a mass of molten glass, and more particularly to the selective heating of said mass during movement thereof toward the working or forming area.

The invention is generally applicable to any type of continuous or semi-continuous glass tank furnace in which glass is melted in one end and flows through and toward the opposite or working end where it is shaped to the desired form. Among the continuous furnaces are the flat glass furnaces for producing sheet and plate glass and among the semi-continuous or intermittent type are the container furnaces which make bottles, tumblers and the like.

All such furnaces in one form or another include a melting area, a refining area, a conditioning or cooling area and a working or forming area.

Another feature that such furnaces have in common is that their walls are made of refractory blocks of varying sizes, depending on their location in the furnace, and with any wall composed of blocks there will of necessity be joints between adjoining ones.

In areas such as in the melting and refining areas of the furnace, this presents no serious problem because of the large mass of the molten glass and the high working temperatures. However, in the conditioning and working areas of the furnace, the bath or stream of molten glass flowing through is often much shallower and the temperature of the glass is lower and more closely controlled. Consequently the presence of joints in the walls here may have a substantial effect on the temperature and uniformity of temperature of the molten glass and may also promote devitrification or the formation of "dog metal" in the area of such joints.

It has previously been recognized that these joints might be undesirable and there has been tendency in the art toward using larger refractory blocks or units in the conditioning and working ends of glass furnaces and, in the flat glass field, monolithic drawpots and working receptacles are quite widely employed to eliminate joints wherever possible in this critical area.

According to the present invention the effect and responsibility of furnace wall joints in critical areas is definitely recognized and catalogued while, at the same time, the inevitability of at least some joints being present in such areas is admitted.

It is therefore the primary object of this invention to provide novel techniques and means for implementing them that will not only effectively compensate for unsatisfactory joint conditions in critical furnace areas but will, in their own right, notably improve the quality of the finished glass product.

It is a further object to accomplish the above by the provision of "strip" heaters which may be located in, at and/or closely adjacent the joints between refractory elements of the furnace wall.

Another object is to better condition glass by applying heat to a moving stream of molten glass along a narrow area or strip extending transversely of the stream.

Still another object is to provide an improved form of heating element for the above purposes.

Further objects and advantages of the invention will become more apparent during the course of the following description, when taken in connection with the accompanying drawings.

In the drawings, wherein like numerals are employed to designate like parts throughout the same:

FIG. 1 is a longitudinal section view through the conditioning and working end of a conventional window glass furnace;

FIG. 2 is a transverse vertical section taken substantially along the line 2—2 in FIG. 1;

FIG. 3 is a fragmentary view on an enlarged scale of the area immediately around two of the floor joints in the cooling chamber, and around the floor wall joints between the draw pot and the cooling chamber and showing the invention applied to the furnace of FIGS. 1 and 2; and FIG. 4 is a fragmentary perspective view of one end of one of the types of strip heating means shown in FIG. 3.

Although in no way restricted thereto, this invention has proved to be particularly valuable in the selective heating of a stream of molten glass at and adjacent to the junction of the cooling chamber and draw pot in flat glass furnaces for supplying the so-called Colburn type machine which produces flat drawn, fire polished window glass. A preferred embodiment will therefore be specifically described in that connection.

Referring now more particularly to the drawings, and with particular reference to FIG. 1, there has been illustrated therein a part of the conditioning and all of the working end of a continuous sheet glass furnace which is designated in its entirety by the numeral 10. Conventional furnaces of this character generally include a gas fired regenerative type melting tank which supplies molten glass to one or more suitable refining or conditioning chambers. The forward or discharge end of the refining chamber (not shown) is joined by a cooling chamber 11 to a working receptacle or draw pot 12 positioned below the drawing or forming chamber 13 of the window glass drawing machine 14.

In this type of flat glass furnace the molten glass moves in a stream 15 from the melting to the working end through a channel formed in the melting chamber, the refining chamber, the cooling chamber 11 and the working receptacle 12.

As the molten glass in the stream flows or moves through the refining chamber and the cooling chamber it is "conditioned" and tempered for drawing into a continuous ribbon 16. Also during this movement from the melting to the working end of the furnace the cross-sectional area of the stream is progressively reduced, due to the size and/or shape of the chambers through which it passes. In other words, the melting and refining chambers are conventionally wide and deep. The channel from the refining chamber is usually of the same depth but narrower than the melting chamber. The cooling chamber 11 is of less depth than the channel from the refining chamber and is usually narrower, terminating in a so-called "goose neck" or a similar restriction to direct the stream into the relatively shallow draw pot 12.

The draw pot 12 in a conventional Colburn type window glass machine is supported upon stools 17 within a pot chamber 18 which is suitably heated usually by gas.

The sheet or ribbon of glass 16 is continuously drawn upwardly from the surface of the molten bath in the draw pot and, while still in a semi-plastic condition, although substantially set in its final sheet form, is deflected into the horizontal plane about a bending roll 19, and then passed through a flattening chamber 20 upon a series of horizontally aligned machine rolls 21. The ribbon advances from the drawing and flattening chamber 20 into a lehr (not shown) wherein it is supported and carried along until suitably annealed.

In order to produce commercially acceptable window glass by flat drawing from a mass of molten glass it is essential: (1) that the molten glass be properly conditioned; (2) that it be at the optimum temperature for working into a flat ribbon; and (3) that the temperature pattern of the molten glass be as nearly symmetrical and stable as possible from one side of the stream to the other at the zone of sheet formation. No particular problem is presented in maintaining and even in controlling, within limits, the temperature of the molten glass within that portion of the working receptacle or draw pot 12 from which the ribbon 16 is actually drawn because, as already explained, the major portion of the draw pot 12 is conventionally supported within the heated pot chamber 18.

However, during movement of the stream of molten glass 15 between the melting and working ends of the furnace, the glass is more or less continuously subjected to changes in temperature. Thus, the glass is melted at temperatures approaching 3000° F. In refining the melted glass relatively high temperatures are also required and the temperature at the exit end of the channel from the refining chamber is normally around 2100° F. Then, within the cooling chamber 11, the molten glass in the stream is caused to lose heat rather rapidly to bring it to the optimum temperature desired for drawing, which is normally around 1700° F.

It is, of course, desirable that the progressive cooling of the stream of molten glass from melting to working temperature be accomplished as uniformly as possible so that, as the glass approaches the zone of sheet formation, the temperature across the stream will be as nearly uniform as possible. However, as a practical matter, with the volume of glass that is normally handled in a commercial window glass furnace, the achievement of anything closely approaching uniform temperature from side to side of the moving stream has been a practical impossibility. Thus, the glass at the edge of the stream will naturally be colder than the glass in the middle of the stream and, due to a variety of conditions that are always present in a conventional window glass furnace, alternate hot and cold streaks, as well as spots and areas of different temperatures tend to develop in the glass stream as it approaches the exit end of the cooling chamber. Moreover, these areas are self-accentuating, i.e., because the colder areas move more slowly they will become still colder, while the hotter and faster moving areas will not be cooled as much and so remain hotter.

Consequently, any existing condition that may set up undesirable temperature differentials is suspect as a possible source of defects in the finished sheet. One possible source of such a condition is, of course, the joints between the refractory blocks in the cooling chamber, and this is particularly true of the joints in the floor of the chamber, toward its exit end and of the joint between the exit end of the cooling chamber and the entrance end of the draw pot. Also, when a baffle or filler block such as shown at 22 is employed at this point it creates two joints as at 23 and 24 between the cooling chamber and the draw pot.

Various means have been tried to overcome the effects of uncontrolled chilling of the molten glass and to equalize temperatures across the glass stream as it approaches the zone of sheet formation. Probably the most widely used is the procedure of providing heat above the surface of the molten glass in the space beneath the front lip tile 25. Also, in connection with the joints between the refractory blocks and particularly the joint or joints between the adjoining ends of the cooling chamber and the draw pot, it has been suggested that heating means be provided close to the joint at the underside of the pot.

However, while such prior heating means counteracted unwanted cooling to some extent, they were open to a number of objections so far as the ultimate purpose in all window glass apparatus of reducing distortion and improving quality in the finished sheet is concerned. Thus, the heating means provided beneath the lip tile was usually an open flame burner commonly called a lip tile fire which introduced a certain amount of dirt and products of combustion into a critical area of the furnace. Secondly such flames added to rather than decreased the uncontrolled air currents in the furnace and the presence of such currents in the furnace particularly at the zone of sheet formation is one of the principal factors responsible for distortion in the finished sheet. A still further objection to temperature control means that is located above the surface of the molten glass is that it defeats its own purpose. Thus, when it is attempted to supply sufficient heat over the glass stream to compensate for cold spots or streaks within or at the bottom of the stream, or to achieve the temperature pattern desired in the full depth of the stream, the upper strata from which the sheet is to be drawn becomes so hot as to objectionably limit the speed at which the sheet can be drawn.

Similarly, when sufficient heat is applied from beneath to the joint between the draw pot and the cooling chamber to overcome the cooling effects of the joint on the molten glass, glass entering the joint will be sufficiently liquid to leak through the joint.

According to the present invention, however, the glass stream as it approaches the zone of sheet formation can be protected from any adverse effects resulting from the presence of the joints between the cooling chamber blocks in the area and from the joint or joints between the cooling chamber and the working receptacle. At the same time the chilling effect of such joints is completely counteracted. In addition a positive heat treating effect is applied to the undersurface of the stream of molten glass in a manner to give an improved temperature pattern of the symmetry necessary to permit a sheet of uniform thickness to be drawn and without objectionable overheating.

Briefly stated, this may be accomplished by locating a strip type of electrical heater in, at and/or closely adjacent any joint in the furnace which may be found to have an adverse cooling effect on the glass or where divitrified glass tends to accumulate.

Generally speaking in a Colburn type of window glass furnace, it is only necessary to locate the strip heaters of the invention at the joints toward the discharge end of the cooling chamber, for example as shown at 26, 27, 28 and 29, and very good results have been had when the strip heaters are associated only with the joint or joints between the discharge end of the cooling chamber and the entrance end of the draw pot as shown at 28 and 29.

As to the form of the heater it may be simply a thin strip of metal such as 0.006" platinum or "Kanthal" stock as shown at 30 and may lie entirely within the joint between the refractory blocks. Alternatively, it may be a single strip which is laid over the joint as shown at 31. Preferably, however, a metal strip or resistance element of the character designated 32 and best shown in FIG. 4 is used. As there shown the resistance heating strip 33 is bent or otherwise shaped throughout its length into a generally V-shaped cross-section having legs 34 and 35 at angles to one another. With this sort of arrangement one leg 34 can be inserted into the joint as shown in FIG. 3 while the other leg 35 lies flat against the wall or floor of the furnace and so provides a larger, although still narrow, heating area exposed to the glass stream moving thereby. Strip heaters of the character and arranged in the manner specifically shown and described here have already been employed in the actual commercial production of window glass on a Colburn type machine and notable improvements have been found in the amount of distortion and other defects observed in the resulting glass ribbon.

It will be apparent that resistance heating strips of practically any accepted construction can be used in practicing the invention, and indeed that heating means other than strip or electrical resistance may be employed to accomplish similar results. Also, where strip heaters are used, various known types of construction and forms of connections may be employed advantageously. For example, as shown in FIGS. 2 and 4, the resistance heating strip 33 of the heater 32 may be built up as at 36 to lower the resistance at the ends of the heater to prevent overheating, while conventional electrical connections for the heaters are indicated diagrammatically at 37 and 38.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the intended scope of the appended claims.

I claim:

1. In a continuous tank-type furnace, a cooling chamber including a floor and opposite side walls defining a channel along which a stream of molten glass flows into a working area, said floor and side walls comprising a plurality of individual refractory elements having joints therebetween extending transversely across said stream, and a strip heating element extending transversely of said stream along one of said joints for counteracting the chilling effect of said one joint on the molten glass and preventing devitrification of the molten glass along said one joint.

2. A continuous tank-type furnace as claimed in claim 1, wherein at least part of said strip heating element is located in said one joint.

3. A continuous tank-type furnace as claimed in claim 1, wherein said strip heating element is heated by electrical resistance, and including means connecting said heating element to a source of electric power.

4. A continuous tank-type furnace as claimed in claim 1, wherein said working area comprises a draw pot from which a glass ribbon is continuously drawn upwardly, said strip heating element being located substantially at the juncture of said cooling chamber and said draw pot and including an angle-shaped electrical resistance member extending longitudinally along said joint with one leg thereof extending into said joint and the other leg thereof disposed along the bottom of said stream, and means connecting said heating element to a source of electric power.

References Cited by the Examiner

UNITED STATES PATENTS

| | | | |
|---|---|---|---|
| 1,933,527 | 10/1933 | Wadman | 13—6 |
| 2,686,820 | 8/1954 | Arbeit et al. | 13—6 |
| 3,151,201 | 9/1964 | Kilian et al. | 13—6 |

DONALL H. SYLVESTER, *Primary Examiner.*

G. R. MYERS, *Assistant Examiner.*